(12) United States Patent
Sodermanns

(10) Patent No.: US 11,577,556 B2
(45) Date of Patent: *Feb. 14, 2023

(54) DUAL WHEEL TYRE INFLATION PRESSURE CONTROL SYSTEM

(71) Applicant: AGCO International GmbH, Neuhausen (CH)

(72) Inventor: Felix Sodermanns, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 354 days.

This patent is subject to a terminal disclaimer.

(21) Appl. No.: 16/771,826

(22) PCT Filed: Nov. 6, 2018

(86) PCT No.: PCT/EP2018/080296
§ 371 (c)(1),
(2) Date: Jun. 11, 2020

(87) PCT Pub. No.: WO2019/115093
PCT Pub. Date: Jun. 20, 2019

(65) Prior Publication Data
US 2021/0170811 A1 Jun. 10, 2021

(30) Foreign Application Priority Data
Dec. 13, 2017 (GB) .................................. 1720751

(51) Int. Cl.
*B60C 23/00* (2006.01)
(52) U.S. Cl.
CPC ...... *B60C 23/00372* (2020.05); *B60C 23/006* (2013.01); *B60C 23/007* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 2,789,617 A 4/1957 Cardi
5,249,609 A * 10/1993 Walker .............. B60C 23/00372
141/38

(Continued)

FOREIGN PATENT DOCUMENTS

DE 29718420 U1 1/1998
EP 2058148 A 5/2009
(Continued)

OTHER PUBLICATIONS

UK Intellectual Property Office, Search Report for UK Priority Application No. 1720747.3, dated Jun. 13, 2018.
(Continued)

*Primary Examiner* — Andre J Allen

(57) ABSTRACT

A dual wheel tyre inflation pressure control system including a pair of vehicle wheels having tyre interiors providing first and second fluid chambers. A first valve arrangement is installed remote from the wheels and is connectable to a pressurised fluid source. A second valve arrangement, suitably mounted on one of the wheels, is connected to the first valve arrangement by means of first and second fluid connections. The second valve arrangement is controllably operable to connect the first fluid connection to either fluid chamber. Controlled variation of fluid pressure in and between the fluid connections is provided by the first valve arrangement to control said second valve arrangement for operating the tyre pressure control system to connect the second fluid chamber to the first valve arrangement, and to connect the first and second fluid chambers.

9 Claims, 12 Drawing Sheets

(52) U.S. Cl.
CPC .. *B60C 23/00318* (2020.05); *B60C 23/00354* (2020.05); *B60C 2200/08* (2013.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/13; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | | |
|---|---|---|---|---|
| 5,465,772 A * | 11/1995 | Sartor | ................. | B60C 23/0408 |
| | | | | 152/416 |
| 9,579,935 B2 * | 2/2017 | Infantini | ................. | B60C 23/00 |
| 11,208,994 B2 * | 12/2021 | Hoff | ...................... | F04B 49/03 |
| 2004/0155516 A1 * | 8/2004 | Colussi | ............. | B60C 23/00363 |
| | | | | 301/5.24 |
| 2005/0081973 A1 | 4/2005 | Marin-Martinod | | |
| 2012/0305126 A1 * | 12/2012 | Merrill | .............. | B60C 23/00363 |
| | | | | 141/38 |
| 2013/0068361 A1 * | 3/2013 | Flory | ................ | B60C 23/00354 |
| | | | | 152/415 |
| 2015/0231937 A1 * | 8/2015 | Holdrich | ........... | B60C 23/00372 |
| | | | | 152/417 |
| 2015/0258863 A1 * | 9/2015 | Gillen | ............... | B60C 23/00354 |
| | | | | 137/224 |
| 2016/0318354 A1 * | 11/2016 | Trostle | .............. | B60C 23/00354 |
| 2021/0170811 A1 * | 6/2021 | Sodermanns | ..... | B60C 23/00354 |

FOREIGN PATENT DOCUMENTS

| | | | | |
|---|---|---|---|---|
| EP | 2196336 B | | 10/2012 | |
| EP | 3 165 383 A1 | | 5/2017 | |
| EP | 3038845 B | | 5/2017 | |
| EP | 3176012 A1 | | 6/2017 | |
| EP | 3904126 A1 * | | 11/2021 | ........... B60C 23/003 |
| GB | 2256836 A | | 12/1992 | |
| GB | 2538971 A * | | 12/2016 | ........... B60C 23/003 |
| JP | H0672113 A * | | 3/1994 | ....... B60C 23/00354 |

OTHER PUBLICATIONS

European Patent Office, International Search Report for International Patent Application No. PCT/EP2018/080296, dated Feb. 13, 2019.

* cited by examiner

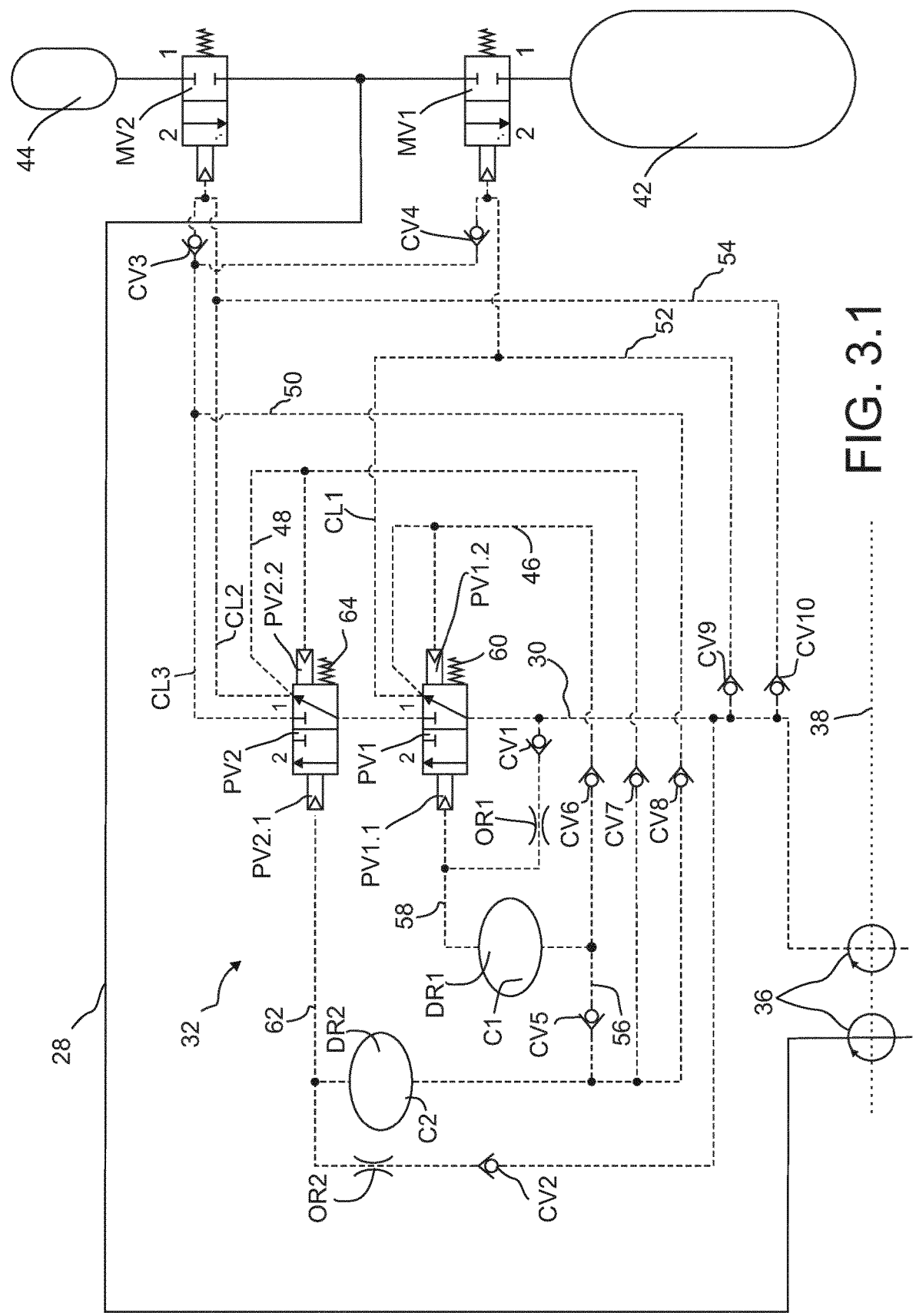
FIG. 3.1

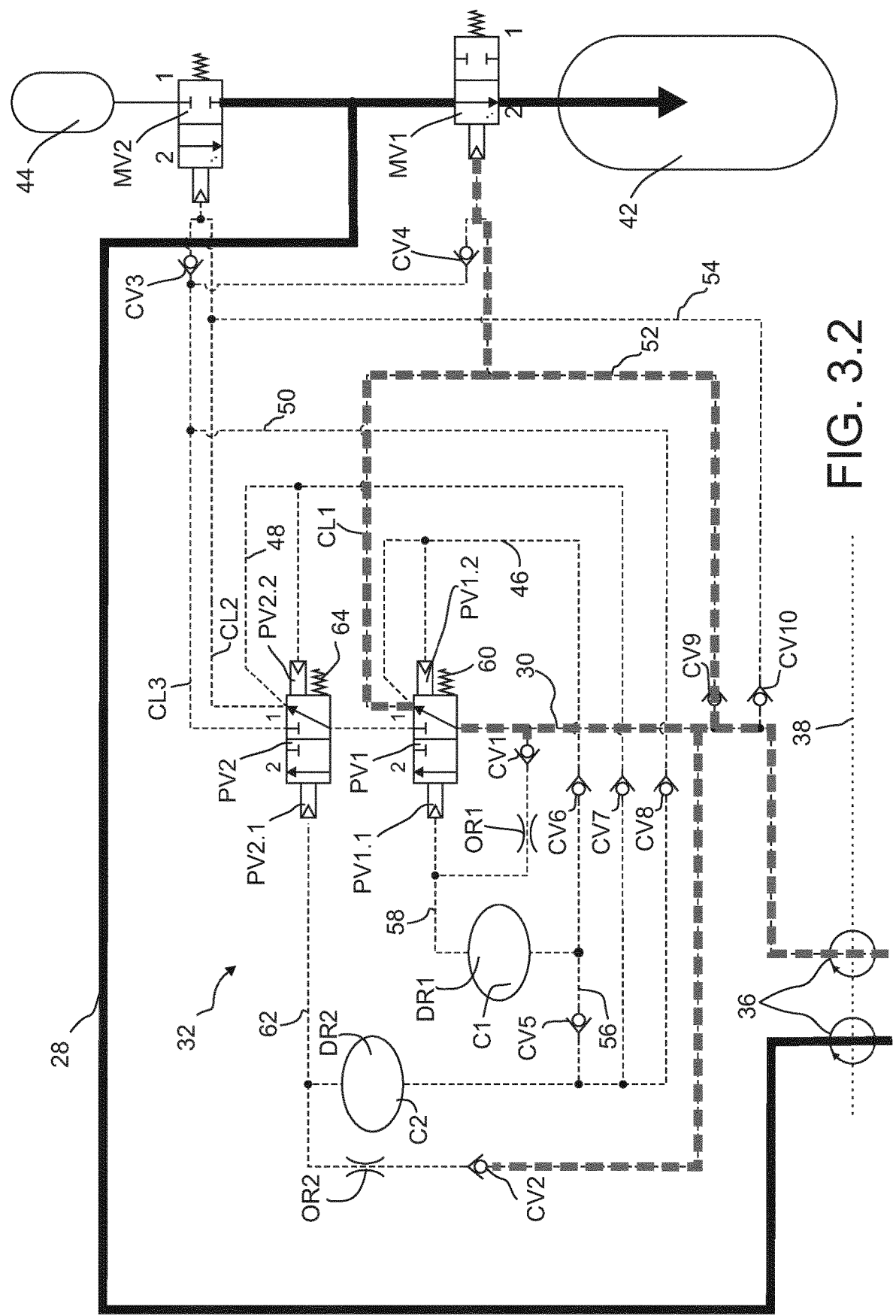
FIG. 3.2

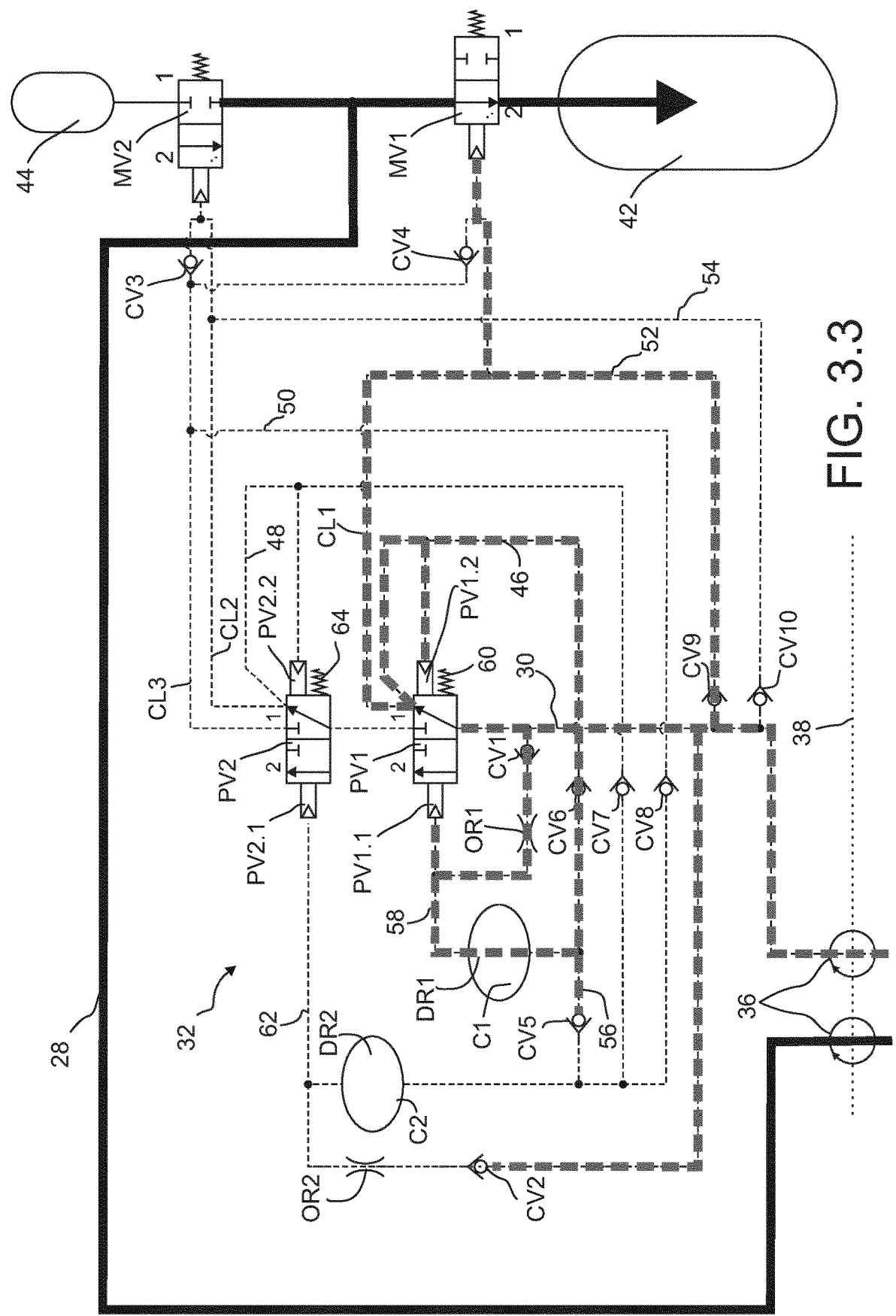
FIG. 3.3

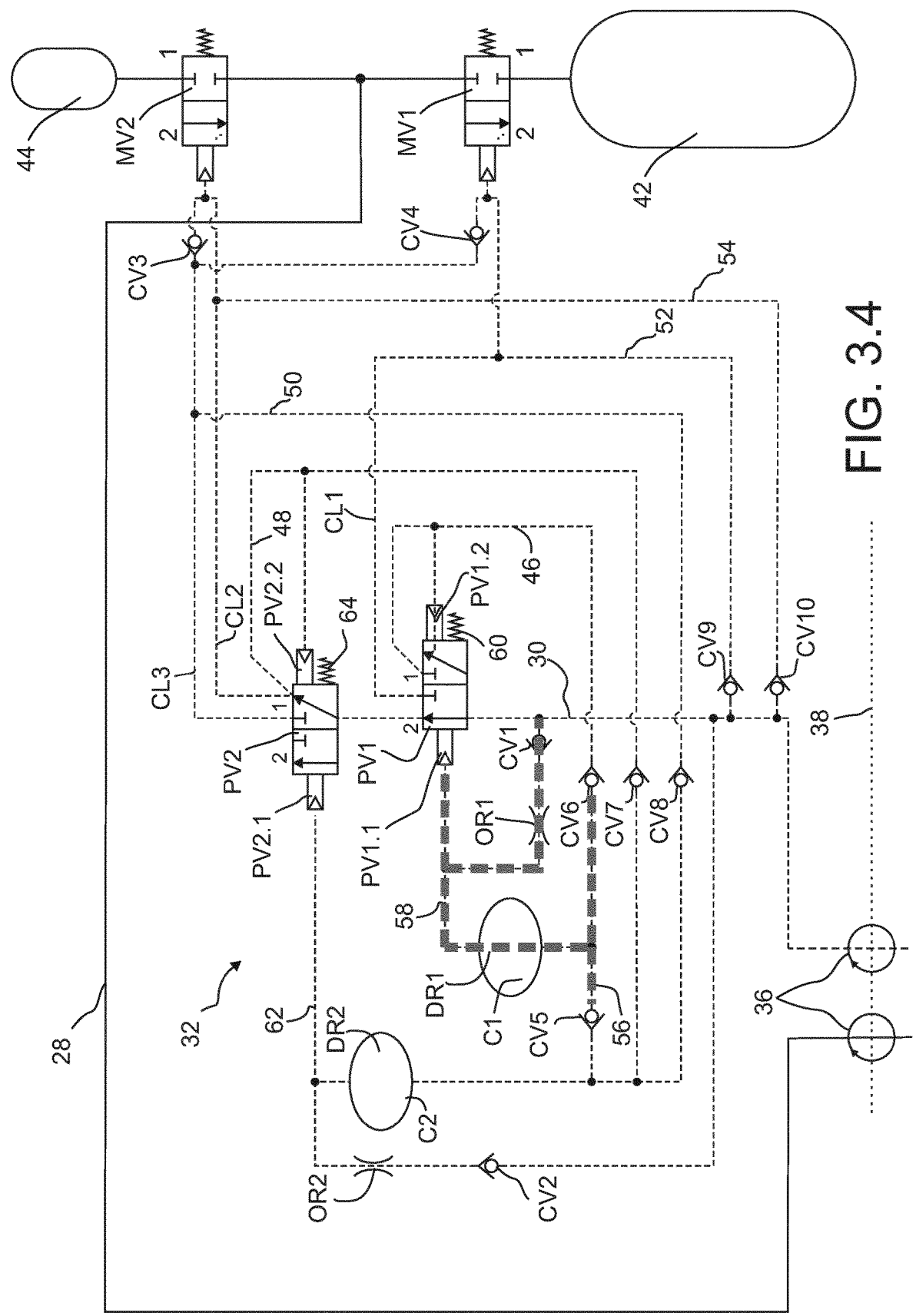
FIG. 3.4

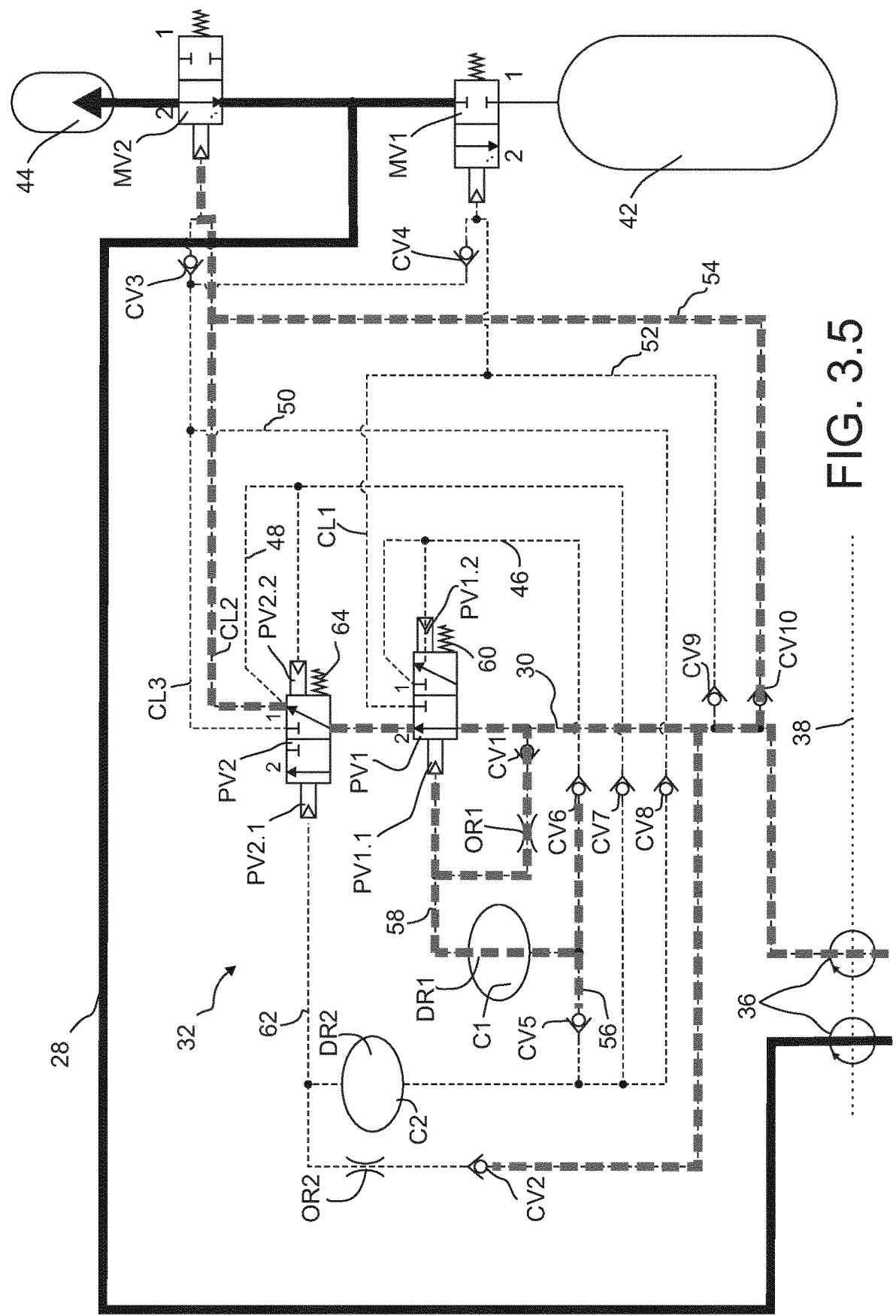
FIG. 3.5

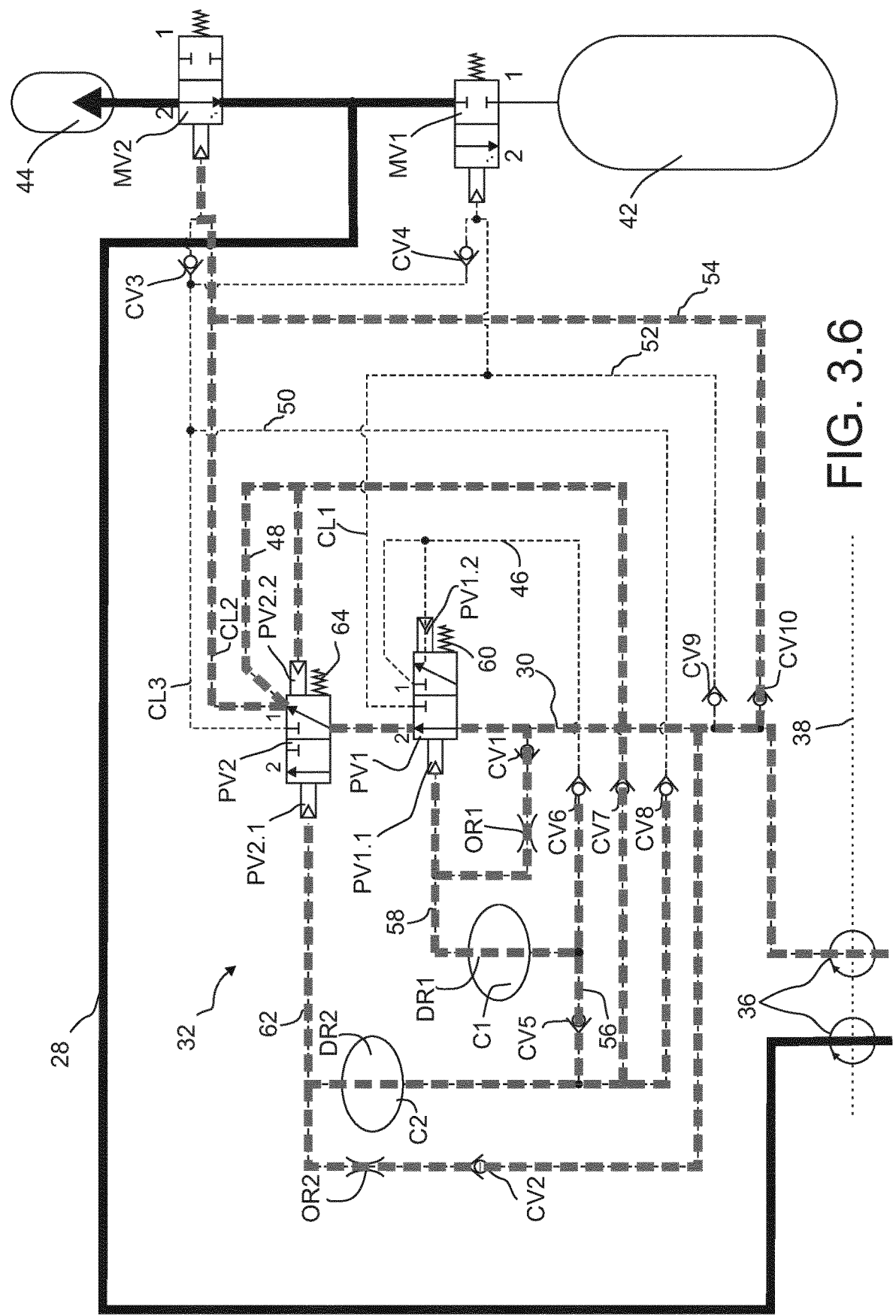
FIG. 3.6

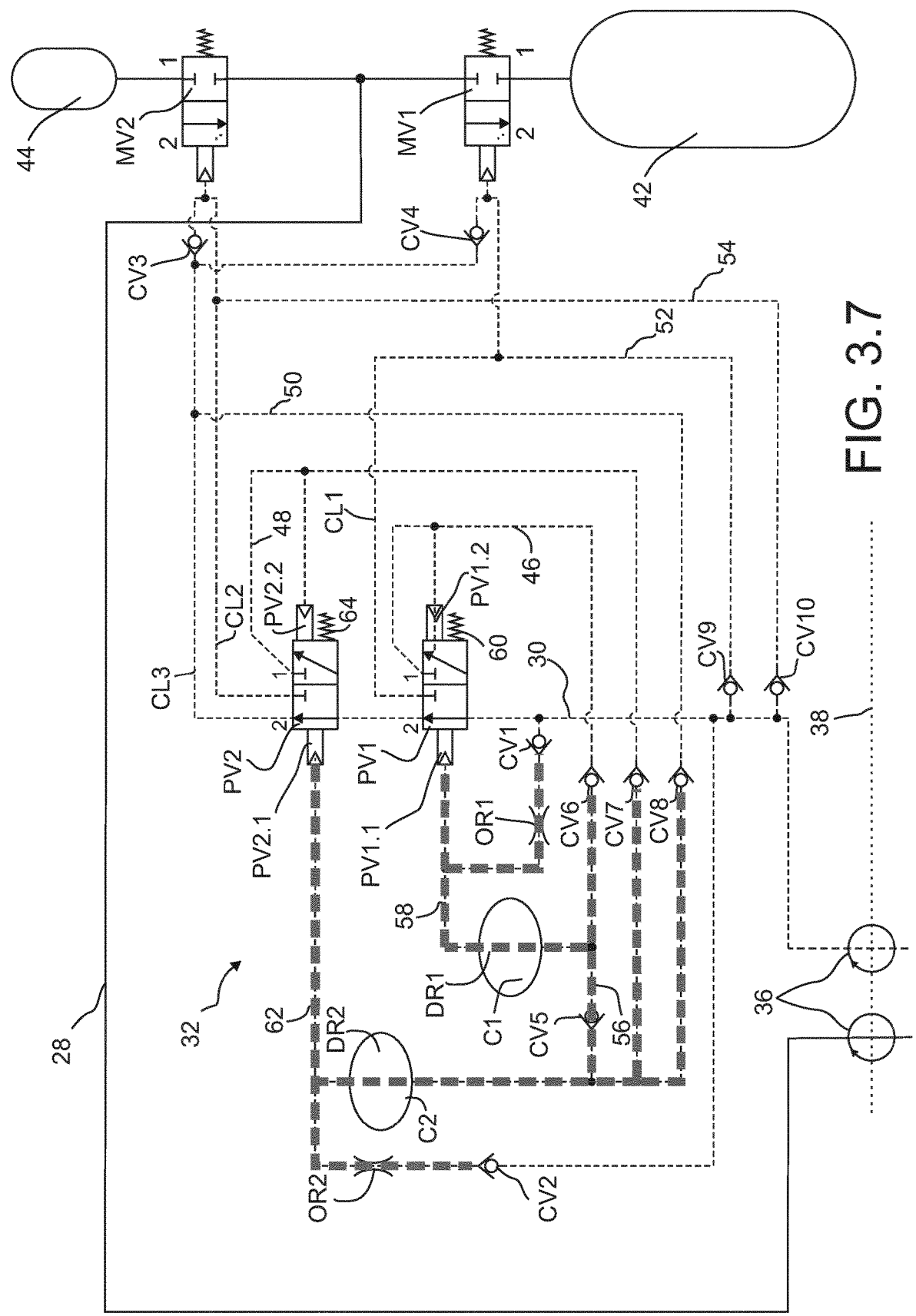
FIG. 3.7

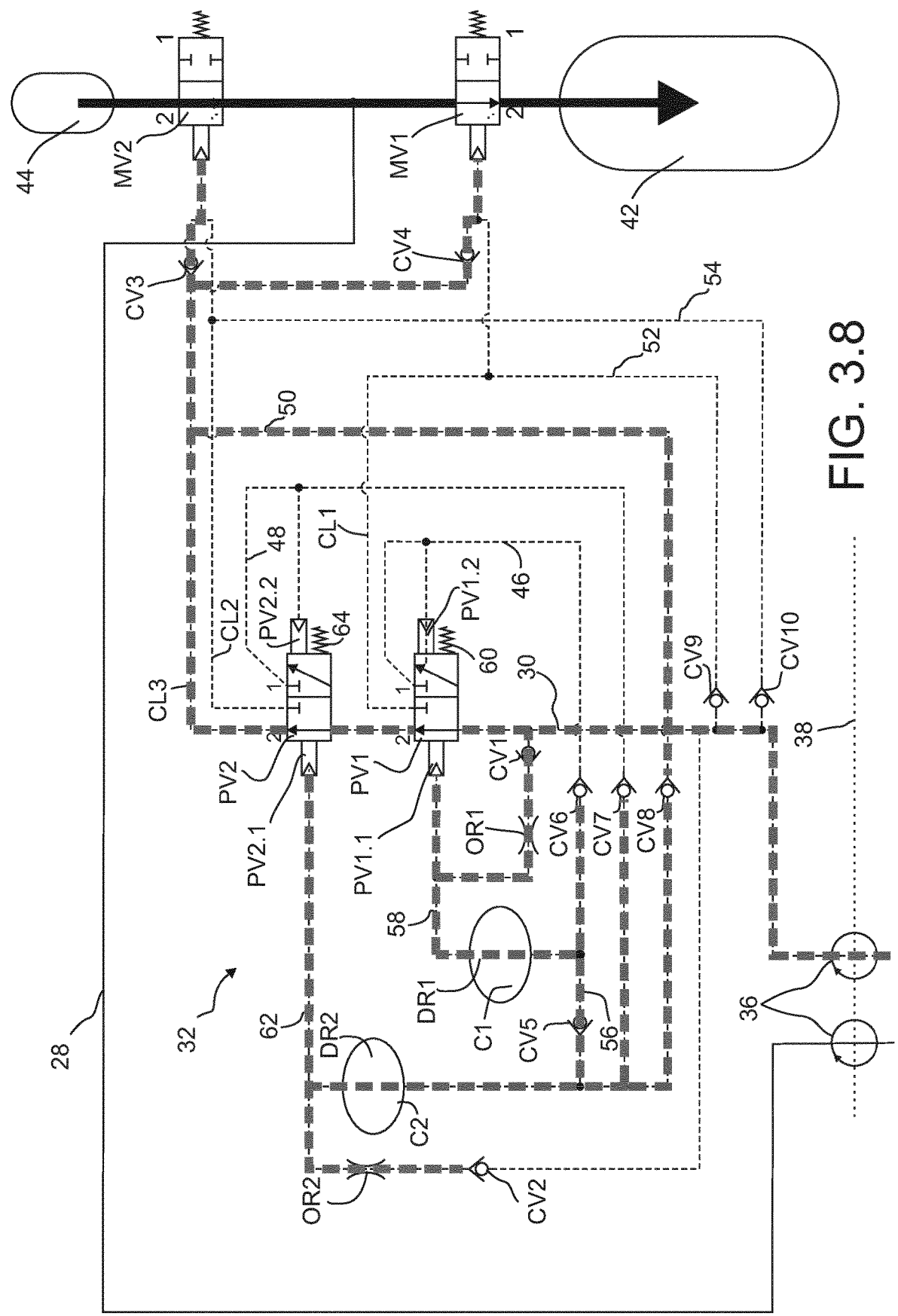
FIG. 3.8

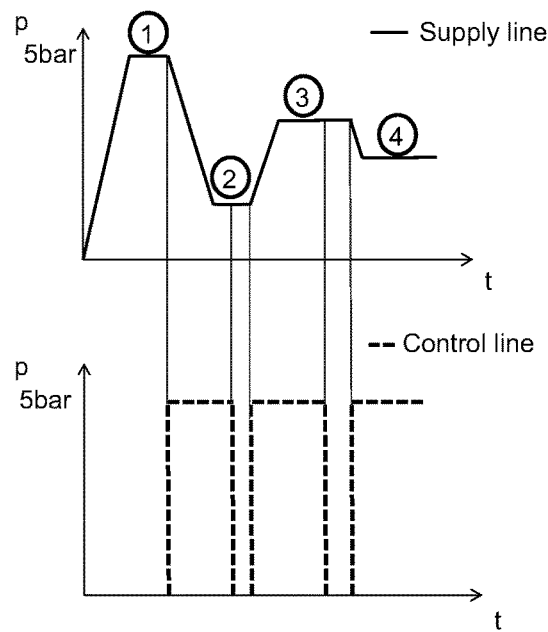
FIG. 4.1
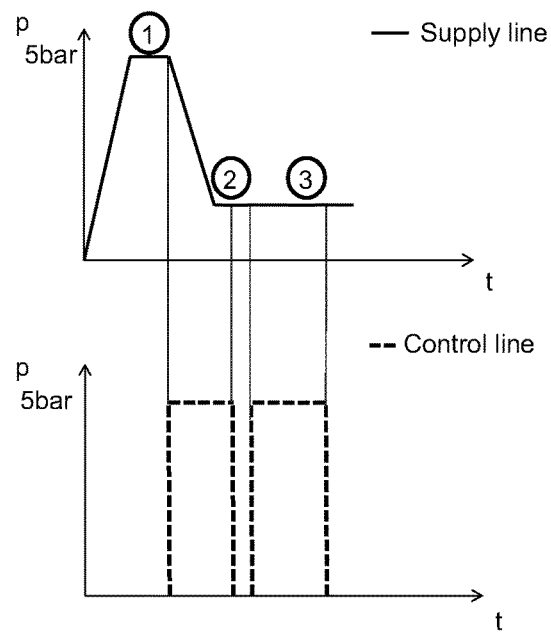
FIG. 4.2
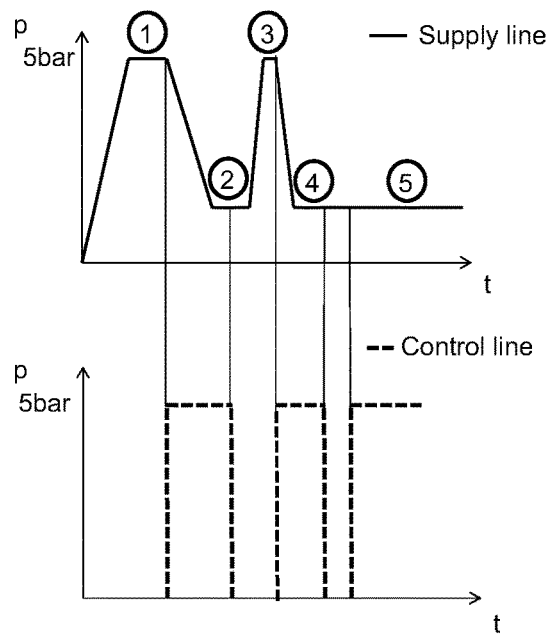
FIG. 4.3

DUAL WHEEL TYRE INFLATION PRESSURE CONTROL SYSTEM

BACKGROUND

Field

The present invention relates to a dual wheel tyre inflation pressure control system comprising a coupled pair of vehicle wheels having first and second fluid chambers provided by tyres mounted on the respective wheel rims, with the system further comprising valve arrangements for controllably supplying pressurised fluid to the chambers.

Description of Related Art

The inflation pressure of vehicle tyres is known to be a contributory factor in the tyre wear, the grip provided by the tyre and the fuel consumption of the vehicle. By reducing the pressure of the tyre, the contact surface with the ground is increased thereby improving the grip which allows a greater power to be transmitted between the vehicle and the ground. This is particularly advantageous in slippery conditions caused by ice or mud for example. Furthermore, when utility vehicles such as tractors operate in wet fields, the power which can be transmitted to the ground is limited and this can be increased by reducing the tyre pressure.

However, an increase in contact surface results in an increase in tyre wear and, as is particularly apparent on hard surfaces at speed, an increase in fuel consumption. Therefore it is recognised that optimum performance of the vehicle is achieved with different tyre inflation pressures for different operating conditions. This has led to the development of automatic inflation and deflation arrangements, generally called tyre pressure control systems (abbreviated as TPCS) which allow the tyre inflation pressure to be changed during operation to optimise the driving characteristics described above. The major challenge of these tyre pressure control systems today is the tyre filing time (time to adjust the pressure from a lower level e.g. 0.8 bar to a higher pressure level, e.g. 2.5 bar) which is mainly a time where the tractor is not productive. For some agricultural applications, e.g. when the tractor is operated strictly on the field for ploughing, the tyre pressure is only changed once, so tyre filling time is not that critical. However for other applications e.g. for slurry transport and application, the tractor frequently changes from field to road operation so that the tyre pressure is changed often. In this case, the tyre filling time has negative impact on overall operating time. To address the issue, different systems are known:

German Utility Model DE 29718420 U1 describes a tyre pressure control system wherein a wheel comprises an integrated compressed air reservoir located on the rim and surrounded by the tyre. Air is transferred from the reservoir to the tyre by means of a valve so as to inflate the tyre when required. The tyre is deflated via the same valve by transferring air to the environment. A control device is also located between the rim and the tyre and serves to control the valve means thereby inflating and deflating the tyre. The tyre pressure is maintained at a set point by the control device automatically activating the valve means in response to a measured distance between the rim and the tyre. The disclosed system does not allow active control of the tyre pressure and serves merely to maintain the pressure at a predetermined value.

United States patent application published as US-2005/0081973 describes a wheel assembly having a tyre mounted upon a rim. A reservoir disposed on the wheel stores gas under pressure for inflating the tyre. A solenoid valve provides a connection between the reservoir and the closed space of the tyre for inflating the tyre. A further solenoid valve provides a connection between the closed space and the atmosphere for deflating the tyre. A data processor which does not rotate with the rim communicates with a controller which does rotate with the rim. The controller feeds electrical signals to the solenoid valves via wireless communication to make them switch. While this system offers the major advantage that the tyre inflation can be provided by using a pre-filled reservoir to reduce the tyre filing time, there is no detail about how the solenoid valves are supplied with electric energy to move the solenoid sliders. In one embodiment, the signals are transferred from chassis to wheel via inductive feedthrough which may also provide the transfer of electric energy. However, inductive feedthrough arrangements are critical in terms of electromagnetic compatibility and require installation places and additional efforts, disabling the use of standard rims.

The present applicants' European patent EP-B-3038845 describes a wheel assembly having a tyre mounted upon a rim wherein a pneumatic valve is provided on the rim which is connected to a valve arrangement on the chassis via a control line and a supply line. The pneumatic valve on the rim is solely provided to open and close the connection of the tyre interior to the supply line. The system is not provided with a reservoir on the tyre so that the tyre filling time is high. However, the system is cheap in terms of the components installed on the rim and may be suitable for many agricultural applications.

The present applicants' European patent EP-B-2196336 describes a tyre pressure control system wherein a wheel comprises an integrated compressed air reservoir located on the rim and surrounded by the tyre. The control signal is transferred wirelessly while the energy supply for the solenoid valve is provided by batteries. Batteries must be seen as a critical component in terms of durability under extreme temperature conditions, and may fully discharge during operation which would disable usage of the TPCS.

A similar requirement exists for TPCS of twin or dual wheel systems. These systems contain two wheels fitted (coupled adjacent) on one side of an axle. Current TPCS for dual wheel systems only provide the conjoint adjustment of the two wheels of an axle by only having one valve connecting both to a supply line. As a consequence, when tyre pressure sensors are used in the supply line, the tyre pressure cannot be determined or adjusted for each wheel. This prohibits proper monitoring and efficient tyre pressure adjustment.

European patent application EP-A-2058148 describes a TPCS system for separate control of the two wheels of a dual wheel system. In a first embodiment, a system is suggested which uses a 4 position valve whereby the 4 indexed positions are adjusted by repeatedly pressurizing the supply line to move to the next position. Using a valve with index positions has the major drawback that in case of failures, it is difficult to detect which position is currently selected. A further embodiment again provides a valve with indexed positions, but with the difference that the positions are moved by electrically controlled solenoids. This requires the transfer of electric energy which, as explained above, is relatively complex.

Regarding tyre pressure in a dual wheel arrangement, there are different operating conditions. On the field each of the wheels is inflated at the same low level to increase the contact surface to improve traction and reduce soil compaction, especially on soft ground and with soil working implements. When the tractor is operated on hard ground with the implement in transport position, e.g. during transfer to next field, it may be advantageous to increase the pressure in one wheel to a high value to take all the load while the pressure in the other wheel is reduced to avoid any contact with the ground. This would reduce the wear in the deflated wheel and increase steering capability. When returning to the next field, pressure can then be transferred from one wheel to the other. If each of the wheels can be inflated/deflated independently, the system enables the alternating inflation/deflation of each tyre during road operation which would balance the wear of the wheels over their lifetime.

OVERVIEW

In accordance with a first aspect of the invention there is provided a dual wheel tyre inflation pressure control system comprising:

a first vehicle wheel having a wheel rim carrying a tyre providing a first fluid chamber;

a second vehicle wheel coupled adjacent to the first and having a wheel rim carrying a tyre providing a second fluid chamber;

a first valve arrangement installed remote from the wheels and connectable to a pressurised fluid source;

a second valve arrangement which is connected to the first valve arrangement by means of a first fluid connection and second fluid connection, wherein the second valve arrangement is controllably operable to connect the first fluid connection to said first fluid chamber and said second fluid chamber on the vehicle wheels;

wherein controlled variation of fluid pressure in the second fluid connection and first fluid connection is provided by the first valve arrangement to control said second valve arrangement for operating said tyre pressure control system in at least two operational modes:
 a first mode, in which the second fluid chamber is connected to first valve; and
 a second mode, in which the first fluid chamber is connected to the second fluid chamber.

The applicant has recognized the above-mentioned problems with known solutions and has developed a system which uses the simple approach of EP-B-3038845 (two line supply to wheel, no wireless transfer required, no electric energy on the wheels required) and the fast filing time of a system wherein the first tyre is provided with a reservoir in the form of the second tyre of the dual wheel pair.

As a further advantage, the invention enables the manufacturer to offer both systems with no design difference in terms of air supply provided on the chassis. So a customer may decide to take the cheaper, but slower system or the more expensive and faster system even as an after sales upgrade.

With the second valve arrangement (which may be mounted on one of the wheels) being controlled by pressure variation in the first and second fluid connections, a two-line control system is provided for charging an air reservoir (second fluid chamber—tyre) on a second wheel, and for inflating a tyre (first fluid chamber) on the first wheel from the reservoir. This is achieved without the use of electrical control components on the wheel.

In the tyre inflation pressure control system, the controlled variation of fluid pressure in the second fluid connection and first fluid connection provided by the first valve arrangement to control said second valve arrangement preferably further provides a third operating mode in which the first fluid chamber is connected to the first valve arrangement.

Also in accordance with the present invention there is provided a utility vehicle comprising a tyre inflation pressure control system as recited above.

Further features of the system are recited in the attached claims, to which attention is now directed, and the disclosures of which are incorporated herein by reference.

BRIEF DESCRIPTION OF THE DRAWINGS

Further advantages of the invention will become apparent from reading the following description of specific embodiments with reference to the appended drawings in which:—

FIGS. 3.1-3.8 are circuit diagram segments illustrating the operation of the system of FIG. 2;

FIGS. 4.1-4.3 illustrate a test method for the system of FIG. 2.

DETAILED DESCRIPTION OF EXAMPLE EMBODIMENTS

Figure 1:
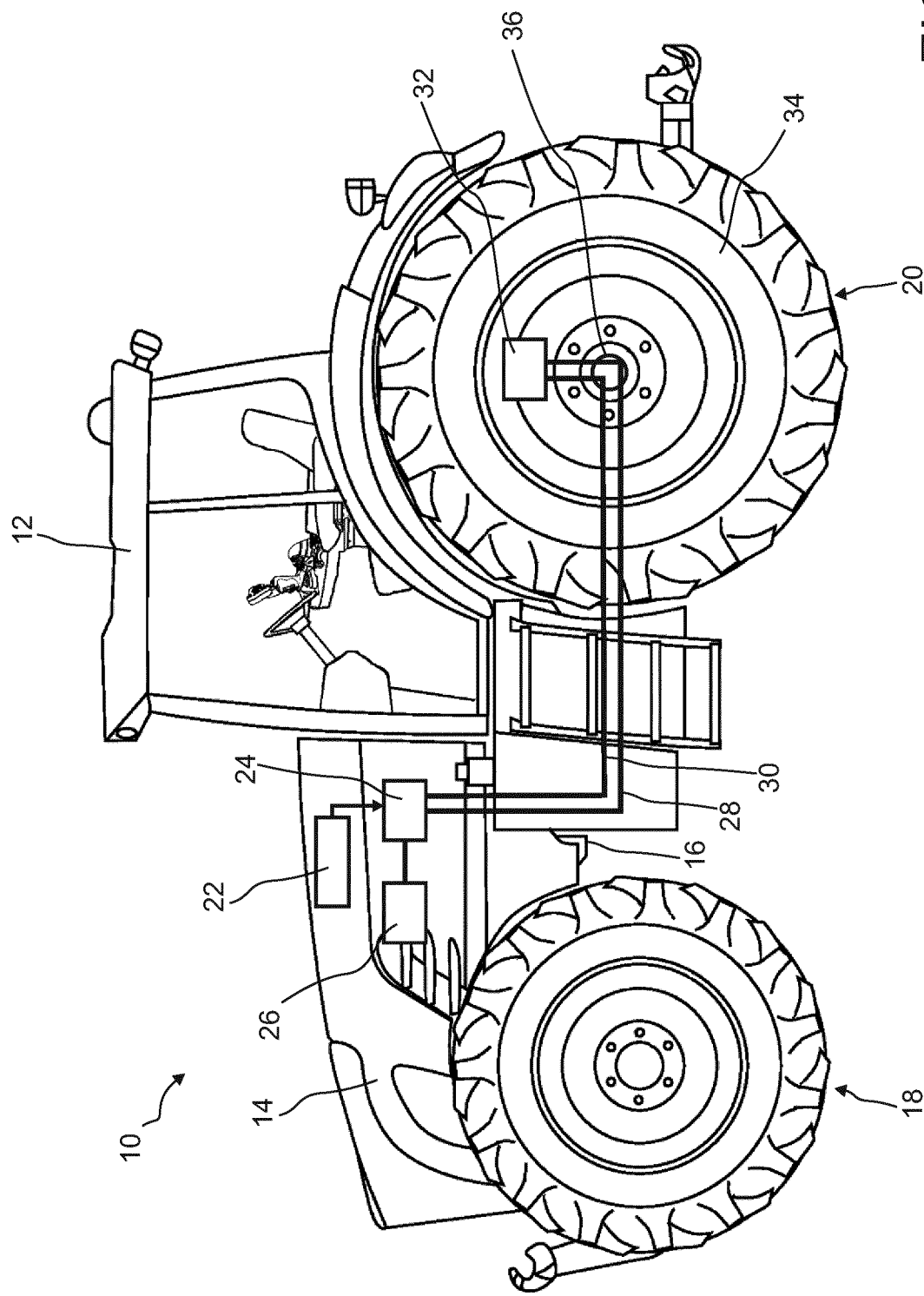
FIG. 1 is a representation of a utility vehicle, in the form of a tractor, suitably provided with a tyre pressure control system embodying the present invention.

Referring to FIG. 1, a utility vehicle in the form of a tractor 10 is shown having a cab 12 and an engine compartment 14. A chassis 16 which is partly visible connects a front wheel suspension and steering assembly (indicated generally at 18) and a rear axle assembly (indicated generally at 20) with at least the rear axle assembly having dual wheels 34, 34' mounted to the axle at each end. A vehicle control system 22 controls various functions of the vehicle, including operation of a first chassis-mounted valve arrangement providing an TPCS air supply 24 which is connected to the tractor air supply system 26. The tractor air supply system 26 includes a compressor (driven by the vehicle engine), an air dryer, a protection valve means and a reservoir to supply air to various consumers on the tractor 10, for example, the tractor braking system, and a trailer braking system. From the TPCS air supply 24, respective supply and control fluid lines 28, 30 connect to a second valve arrangement (hereinafter referred to as a pilot control valve manifold PVM) 32 on one of each pair of the rear wheels 34, 34' of the vehicle 10.

There are various options for connecting the TPCS air supply 24 to the PVM 32 on the rotating wheels 34, 34'. A preferred option is by the use of a radial feedthrough 36 comprised of fluid channels running along the axle on which the rear wheel is mounted. An example of such a rotary feedthrough is described in the present applicants' European patent EP-B-3038845.

Figure 2:
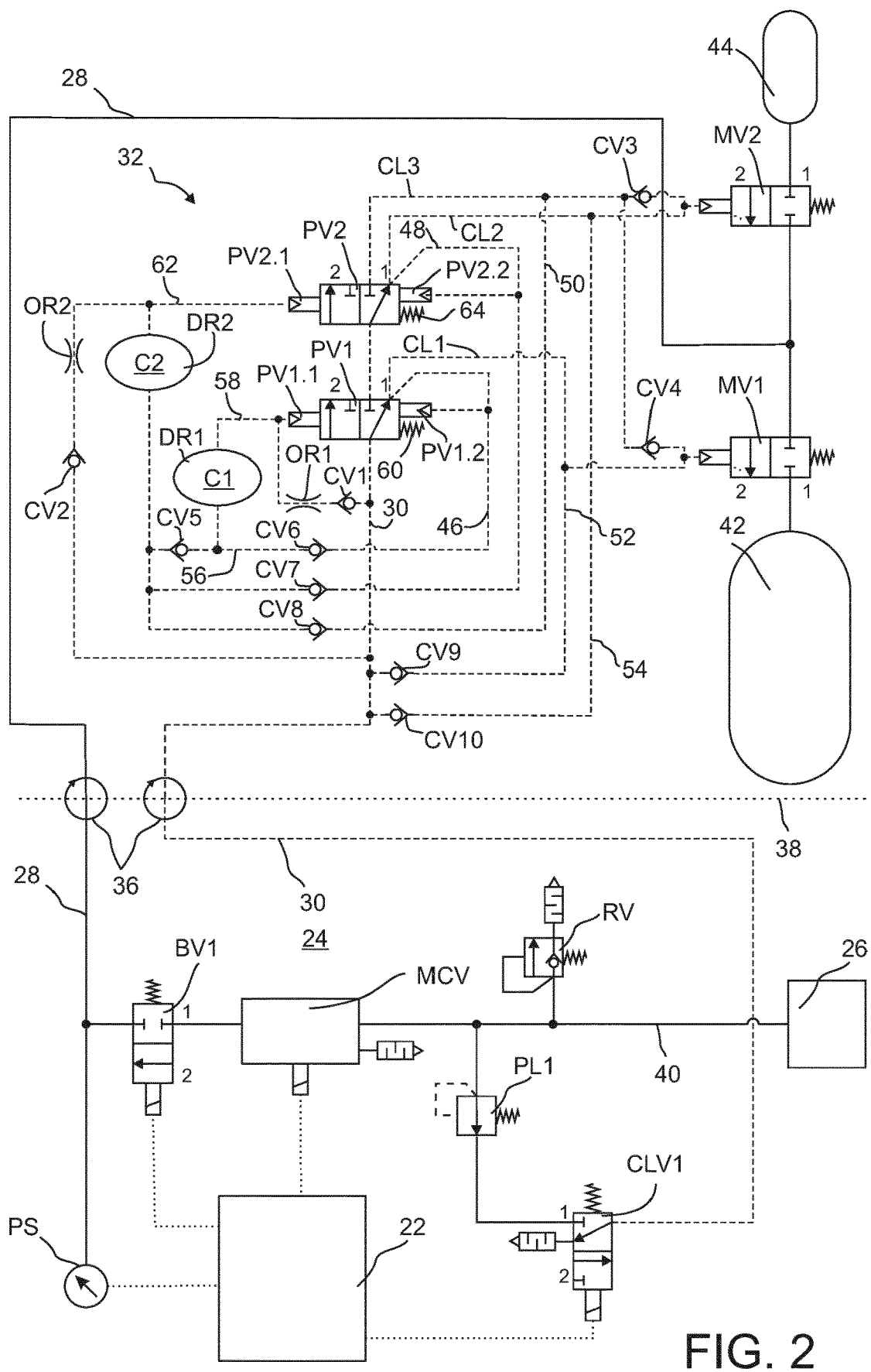
FIG. 2 is a circuit diagram of a tyre pressure control system embodying the present invention.

FIG. 2 is a circuit diagram of the tyre pressure control system (TPCS) for the vehicle 10 of FIG. 1. Those features shown below dotted line 38 comprise the chassis-mounted components including TPCS air supply 24 and tractor air supply system 26, whilst those features shown above line 38 comprise the wheel-mounted components including PVM 32. Whilst shown and described with reference to only a single dual wheel pair, it will be understood that the arrangement will be replicated for two or four wheel pairs of the vehicle. Furthermore, FIG. 2 represents the circuit diagram including separate valves. These valves may be single functional units connectable via respective lines or may be provided by one or more valve manifolds with integrated valve inserts and bores forming the connecting lines.

The function of the TPCS air supply 24 is now explained:

Under control of the control system 22, a valve manifold MCV is connectable to the output of the tractor air supply system 26 (on supply line 40). The output from valve manifold MCV via two-port two-position control valve BV1 provides pressurised air to the TPCS on supply line 28. A pressure relief valve RV is connected to vent to atmosphere at any over-pressure on line 40. Pressure limit valve PL1 reduces the pressure to about 5 bar (to enable the use of smaller components connected to main control line 30 while the main supply line 28 may be supplied with the same or higher pressure, say 5 to 8 bar) and connects line 40 to an input of three-port two-position solenoid control valve CLV1. The control valve CLV1 is spring-biased to connect line 40 and the output from pressure limit valve PL1 to the control line 30: on application of a current (current feed) coming from control system 22, solenoid of control valve CLV1 is moved against the spring force to a second position in which control line 30 is connected to line 40. The circuit for TPCS air supply 24 shown in FIG. 2 is a simplified representation to depict the basic functionality. Valve manifold MCV, two-port two-position control valve BV1 and control valve CLV1 may not be solenoid controlled as described above but may be pneumatically controlled with upstream solenoid pilot control valves such as described in the present applicants' European patent EP-B-3038845.

Figure 5:
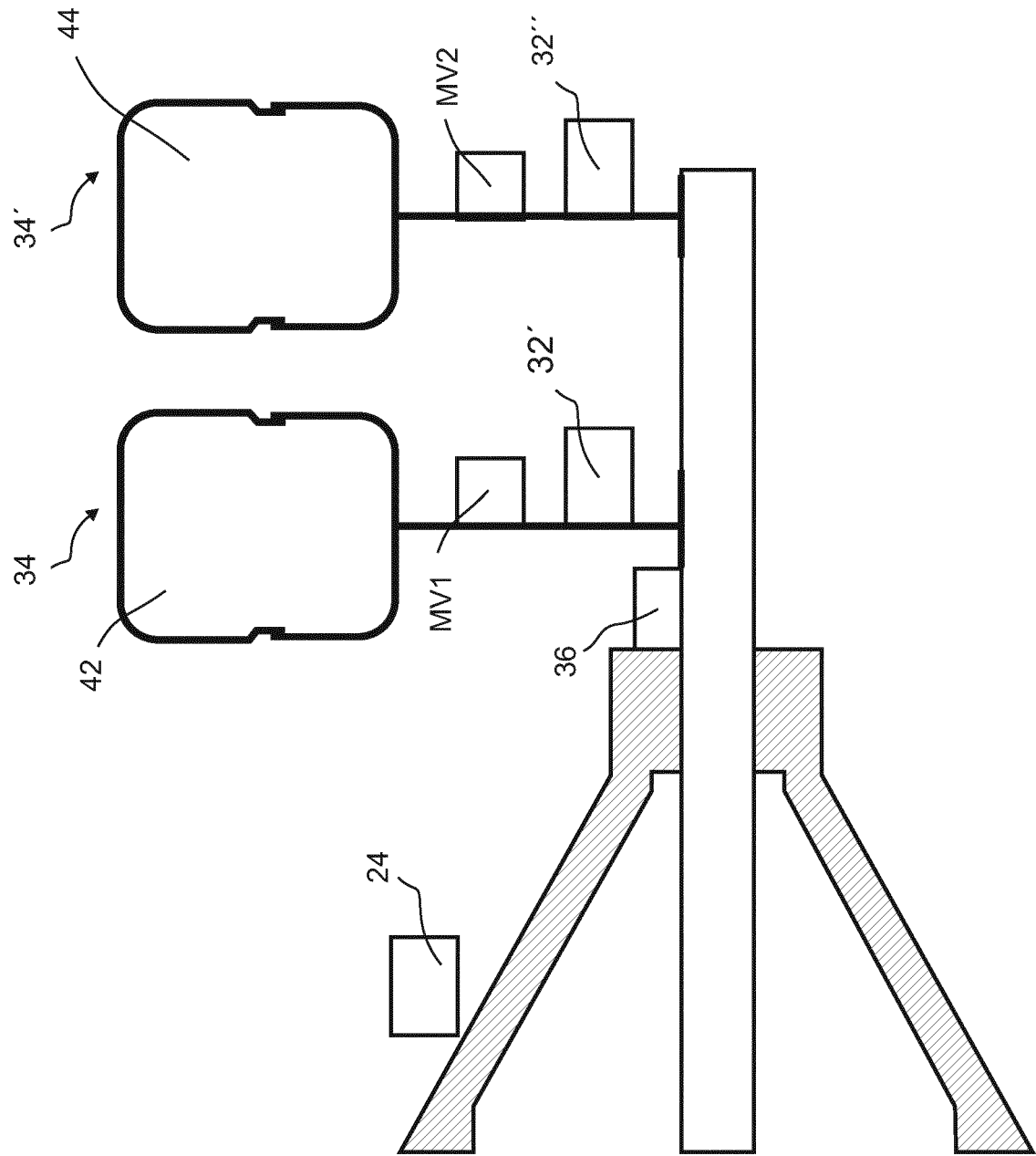
FIG. 5 schematically represents a distribution of components for a dual wheel system.

Turning now to the components on the dual wheel pair, with additional reference to FIG. 5, a first fluid chamber 42 is provided by the interior of the tyre mounted on the rim of the first wheel 34. The first fluid chamber is connectable to the supply line 28 via a first main (lock) valve MV1 which is suitably mounted on the rim of the first wheel 34. A second fluid chamber 44 is provided by the interior of the tyre mounted on the rim of the second wheel 34'. This second fluid chamber 44, which provides a tyre reservoir for the tyre on the first wheel 34 (as explained further below), is connectable to the supply line 28 via a second main (lock) valve MV2 which is suitably mounted on the rim of the second wheel 34'. In the illustration of FIG. 5, the components of PVM are distributed between the first wheel 34 (PVM 32') and second wheel 34' (PVM 32") but it will be understood that all components of the PVM 32 (and indeed both first and second main valves MV1, MV2) may be mounted on just one of the wheels. In the following description, PVM 32 will be referred to as a single entity.

In dependence on pressure in the control line 30, the PVM 32 is configured to selectively operate the main valves MV1, MV2 (in a manner described below) to connect the first or second chambers 42, 44 to the supply line 28, or to each other such as to inflate the (first) tyre interior from the (second) tyre interior providing the reservoir. Furthermore, main valves MV1, MV2 are also operated to measure the pressure in the respective tyre interiors and to pressurize supply line 28 to ensure proper sealing contact in rotary feedthrough 36 prior to any inflation or deflation, as described in the present applicants' European patent EP-B-3038845.

Within the PVM 32, the control line 30 (hereinafter referred to as the main control line) is connected to the input of a first three-port two-position pressure control valve PV1. A first output of valve PV1 is connected via a control line CL1 to the actuator of main valve MV1 in opposition to a spring force of valve MV1 set to typically 4 bar. This means that when a pressure exceeding 4 bar is present on line CL1, main valve MV1 will move to connect the first chamber 42 to the supply line 28. The pressure control valve PV1 is spring-biased to the position in which the input is connected to the first output. The first output of pressure control valve PV1 is also connected via line 46 to a pressure actuator PV1.2 of valve PV1 in support of the spring, such that when control line CL1 is pressurised, valve PV1 is locked in position 1.

The first output from pressure control valve PV1 on line 46 is further connected via a check valve CV6 to the input of pressure chamber C1 provided by pressure delay valve DR1. The output of pressure chamber C1 is connected to a pressure actuator PV1.1 of valve PV1 (acting in opposition to PV1.2) and also, via a flow restriction orifice OR1 and check valve CLV1, back to main control line 30. As will be understood, the pressure delay valve DR1 comprises a chamber that passes through applied pressure and discharges that pressure through flow restriction orifice OR1 and check valve CLV1 when the control line 30 is not pressurized; a suitable configuration for pressure chamber C1 in this case is that the pressure is discharged completely 2 seconds after the control line 30 is connected to ambient. In other words, the pressure on pressure actuator PV1.1 of valve PV1 is kept for two seconds after the control line is discharged to ambient. Due to the installation of the chamber C1 as shown in FIG. 2, the chamber C1 instantly fills when control line 30 is pressurized as the volume of chamber C1 is relatively small compared to the volume supplied in control line 30. In contrast to that, when the control line 30 is discharged, the air must pass orifice OR1 providing a time delay regarding the discharging of chamber C1 and thereby the connected lines and pressure actuator PV1.1 Depending on the volume of chamber C1 and the reduction in orifice OR1, this time (delay) may be adapted.

A second position of pressure control valve PV1 connects the input (main control line 30) to the input of a second pressure control valve PV2. Second pressure control valve PV2 is spring-biased to a position (as shown) in which the input is connected to a first output from which a control line CL2 delivers the input pressure to actuate the second main valve MV2 and thereby connect the second chamber 44 (second tyre) to the supply line 28. The detailed function of pressure control valve PV1 in combination with the pressure chamber C1, flow restriction orifice OR1 and check valve CLV1 is explained below with reference to FIGS. 3.1 to 3.8.

As with the first pressure control valve, the first output of the second pressure control valve PV2 is connected (via a line 48) to an actuator PV2.2 of the second control valve acting together with the spring bias to lock the second pressure control valve in position when in position 1. The output on line 48 is further connected via a control valve CV7 to the input of a further pressure chamber C2 provided by a second pressure delay valve DR2. The output of pressure chamber C2 is connected to a pressure actuator PV2.1 of valve PV2 (acting in opposition to PV2.2) and also, via a flow restriction orifice OR2 and check valve CV2, back to main control line 30. As before, a suitable configuration for pressure chamber C2 in this case is that the pressure is discharged completely 2 seconds after the control line 30 is connected to ambient. In other words, the pressure on pressure actuator PV2.1 of valve PV2 is kept for two seconds after the control line is discharged to ambient.

Due to the installation of the chamber C2 as shown in FIG. 2, the chamber C2 instantly fills when control line 30 is pressurized as the volume of chamber C2 is relatively small compared to the volume supplied in control line 30. In contrast to that, when the control line 30 is discharged, the air must pass orifice OR2 providing a time delay regarding the discharging of chamber C2 and thereby the connected lines and pressure actuator PV2.1 Depending on the volume of chamber C2 and the reduction in orifice OR2, this time (delay) may be adapted. The detailed function of pressure control valve PV2 in combination with the pressure chamber C2, flow restriction orifice OR2 and check valve CLV2 is explained below with reference to FIGS. 3.1 to 3.8.

A second position of pressure control valve PV2, connects the input (from main control line 30 when connected via PV1) to a third PVM control line CL3 which delivers the input main control line pressure, via respective check valves CV4, CV3, to actuate both the first and second main valves MV1, MV2 and thereby connect the first and second fluid chambers 42, 44 to each other to charge the first tyre inner space (fluid chamber 42) from the second tyre (fluid chamber 44).

A further line 50 connects control line CL3 (between PV2 and CV3) via a check valve CV8 to the input of pressure chamber C2. A further line 52 connects control line CL1 (between PV1 and MV1) via a check valve CV9 to the main control line 30. A further line 54 connects control line CL2 (between PV2 and MV2) via a check valve CV10 to the main control line 30. A further line 56 connects the input of pressure chamber C2 via a check valve CV5 to the input of pressure chamber C1.

FIGS. 3.1 to 3.8 depict the functionality of the PVM 32 which is mainly to supply the chambers 42, 44. Bold lines in the figures indicate those fluid lines under pressure whereby the supply line may show more than one operating condition in the respective Figure.

FIG. 3.1 shows the system in an initial state, with no pressure in the control line 30 and the first and second main valves MV1, MV2 closed to isolate the first and second fluid chambers (tyres) 42, 44. In this state, applying/removing pressure on the supply line 28 acts to pressurise/depressurise fluid seals in the rotary feedthrough 36. During pressurizing the seals, leakages may be detected by monitoring pressure in the supply line 28 by means of pressure sensor PS shown in FIG. 2.

In FIG. 3.2, the main control line 30 is pressurised. With pressure control valve PV1 in its first position, control line CL1 is pressurised causing actuation of main valve MV1 which connects the first tyre interior (chamber 42) to the supply line 28. In this state, the TPCS can inflate/deflate the first tyre interior as well as measure the pressure in the tyre interior via main supply line 28 as indicated with the bold line.

As shown in FIG. 3.3, with the main control line 30 pressurised and with pressure control valve PV1 in its first position, pressure is also applied on line 46 and from there to pressure actuator PV1.2. The pressure on line 46 is also applied (via check valve CV6 and pressure chamber C1) on line 58 and pressure actuator PV1.1 but the pressure on pressure actuator PV1.1 is rising with the filling of chamber C1. After the chamber C1 has filled completely, full pressure is applied on pressure actuator PV1.1. However, the pressure applied on pressure actuator PV1.2 and the additional force of spring 60 keeps pressure control valve PV1 in the shown position 1 against the pressure on pressure actuator PV1.1. In this state, the TPCS can still inflate/deflate the tyre interior as well as measure the pressure in the tyre interior via main supply line 28 as indicated with the bold line.

In FIG. 3.4 control line 30 is discharged to ambient which drops the pressure on control line CL1 allowing main valve MV1 to close and isolate (first tyre) chamber 42. The pressure in chamber C1 remains thereby pressure control valve PV1 is moved to its second position by the residual pressure from chamber C1 on line 58 and pressure actuator PV1.1 overcoming the force of the spring 60 of PV1 (as pressure actuator PV1.2 is not pressurized). In this position of PV1, the input (control line 30) is connected to the input of the second pressure control valve PV2. After a certain time, enough of the pressure in chamber C1 would be discharged via the orifice OR1 for the force of the spring 60 to overcome the residual pressure on line 58 and pressure actuator PV1.1 and return the first pressure control valve PV1 to its first position.

In FIG. 3.5, the main control line 30 is again pressurised prior to the chamber C1 being completely discharged so that the pressure control valve PV1 is still in its second position Due to the design of pressure control valve PV1, line 46 is not connected to line 30 when in second position. As a consequence pressure actuator PV1.2 is not pressurized and the pressure applied on pressure actuator PV1.1 can keep first pressure control valve PV1 in its second position. With the first pressure control valve PV1 still in its second position, and the second pressure control valve PV2 in its first position, control line CL2 is pressurised causing actuation of the second main valve MV2 which connects the second tyre or reservoir (chamber 44) to the supply line 28. In this state, the TPCS can pressurise or depressurise the second tyre as well as measure the pressure in the second tyre (reservoir) via main supply line 28 as indicated with the bold line.

As shown in FIG. 3.6 with the main control line 30 pressurised and with pressure control valve PV2 in its first position, pressure is also applied on line 48 and from there to pressure actuator PV2.2 The pressure on line 48 is also applied (via check valve CV7 and pressure chamber C2) on line 62 and pressure actuator PV2.1. However, the pressure applied on pressure actuator PV2.2 and the additional force of spring 64 keeps pressure control valve PV2 in the shown position 1 against the pressure on pressure actuator PV2.1.

As line 58 is also charged via line 56, and pressure chamber C1 the pressure actuator PV1.1 is pressurized via check valves CV5 and CV7 connecting the input of chamber C1 to line 48 and keeps first pressure control valve PV1 in its second position. In this state, the TPCS can still pressurise or depressurise the second tyre as well as measure the pressure in the second tyre via main supply line 28 as indicated with the bold line.

In FIG. 3.7 control line 30 is discharged to ambient which drops the pressure on control line CL2 allowing main valve MV2 to close and isolate second tyre chamber 44. The pressure in chamber C2 remains, thereby pressure control valve PV2 is moved to its second position by the residual pressure from chamber C2 on line 62 overcoming the force of the spring 64 of PV2 (as pressure actuator PV2.2 is not pressurized). In this position of PV2, the input (control line 30 via PV1) is connected to the third control line CL3. After a certain time, enough of the pressure in chamber C1 would be discharged via the orifice OR1 for the force of the spring 60 to overcome the residual pressure on line 58 and return the first pressure control valve PV1 to its first position, and enough of the pressure in chamber C2 would have discharged via the orifice OR2 for the force of the spring 64 to overcome the residual pressure on line 62 and return the second pressure control valve PV2 to its first position (returning the PVM 32 to the initial configuration of FIG. 3.1).

In FIG. 3.8, the main control line 30 is again pressurised prior to the chamber C1 and C2 being completely discharged. With the first and second pressure control valves PV1, PV2 still in their respective second positions, control line CL3 is pressurised causing actuation of both the first and second main valves MV1, MV2 which connects the second tyre or reservoir (chamber 44) to the first tyre interior (chamber 42). In this state, the first tyre interior may be inflated (or further inflated) from the reservoir provided by the second tyre. In this state, pressure is also applied on line 50 (via check valve CV8) to the input of pressure chamber C2, which starts to charge. Pressure chamber C1 is also charged via line 56 and check valves CV5 and CV8 connecting the input of chamber C1 to line 50.

The correct operating of the first and second main valves MV1, MV2 (and hence the proper functioning of PVM 32) may be determined from charging the supply line 28 and then monitoring supply line pressure as a sequence of operations are performed, as shown in FIGS. 4.1-4.3. As will become apparent, different methods are required depending on whether the pressure in the two tyres (chambers 42, 44) is different or equal.

Starting with FIG. 4.1, the upper trace shows the pressure in supply line 28 and the lower shows the pressure in control line 30 as the following steps 1-4 (also denoted on the upper trace) are performed.
1. Supply line 28 is charged with air to a predetermined pressure (e.g. 5 bar) to ensure proper contact.
2. The first main control valve MV1 is opened. The pressure in supply line 28 decreases to the pressure level of the first tyre interior (chamber 42).
3. The first main control valve MV1 is closed and the second main control valve MV2 is opened. The pressure in supply line 28 increases to the pressure level of the second tyre interior or reservoir (chamber 44).
4. Both main control valves MV1 and MV2 are opened. The pressure in the two tyres (chambers 42, 44) is balanced (that is to say the pressure line should show a pressure level between that detected at steps 2 and 3 if the system is working correctly.

For the purposes of illustration, FIG. 4.2 shows why the above technique cannot be used when the pressure in the two tyres (chambers 42, 44) is equal.
1. As above, supply line 28 is charged with air to a predetermined pressure (e.g. 5 bar) to ensure proper contact.
2. As above, the first main control valve MV1 is opened. The pressure in supply line 28 decreases to the pressure level of the first tyre interior (chamber 42).
3. As above, the first main control valve MV1 is closed and the second main control valve MV2 is opened. However, because the pressure in the two tyres is equal, the pressure in supply line 28 does not change. Without change, the system cannot check if the main control valve MV2 has really been opened, and so the test fails.

FIG. 4.3 shows a modified technique applied when the first and second tyre interior pressures are equal.
1. As above, supply line 28 is charged with air to a predetermined pressure (e.g. 5 bar) to ensure proper contact.
2. As above, the first main control valve MV1 is opened. The pressure in supply line 28 decreases to the pressure level of the first tyre interior (chamber 42).
3. First main control valve MV1 is closed and the pressure in supply line SL is raised to 5 bar. This pressure level can only be reached if MV1 and MV2 were closed prior to the test.
4. MV2 is opened. The pressure in supply line decreases to pressure level of the second tyre interior (chamber 44).
5. MV1 and MV2 are opened. As the pressure in TI and TR is balanced, this time there should be no change in pressure in the supply line 28 to indicate a correct operation.

In the foregoing the applicants have described a dual wheel tyre inflation pressure control system which includes a pair of vehicle wheels having tyre interiors providing a first and second fluid chambers 42, 44. A first valve arrangement 24 is installed remote from the wheels and is connectable to a pressurised fluid source 26. A second valve arrangement 32, suitably mounted on one of the wheels, is connected to the first valve arrangement 24 by means of first and second fluid connections 28, 30. The second valve arrangement 32 is controllably operable to connect the first fluid connection 28 to either fluid chamber 42, 44. Controlled variation of fluid pressure in and between the fluid connections 28, 30 is provided by the first valve arrangement 24 to control said second valve arrangement 32 for operating the tyre pressure control system to connect the second fluid chamber 44 to the first valve arrangement 24, and to connect the first and second fluid chambers 42, 44.

From reading of the present disclosure, other modifications will be apparent to those skilled in the art. Such modifications may involve other features which are already known in the field of vehicle air supply and tyre inflation systems and component parts therefore and which may be used instead of or in addition to features described herein.

The invention claimed is:

1. A dual wheel tyre inflation pressure control system comprising:
a first vehicle wheel comprising a wheel rim carrying a tyre providing a first fluid chamber;
a second vehicle wheel coupled adjacent to the first wheel and comprising a second wheel rim carrying a second tyre providing a second fluid chamber;
a first valve arrangement installed remote from the first and second wheels and connectable to a pressurised fluid source;
a second valve arrangement connected to the first valve arrangement by a first fluid connection and a second fluid connection, wherein the second valve arrangement is controllably operable to connect the first fluid connection to the first fluid chamber and the second fluid chamber on the first and the second wheels;
wherein controlled variation of fluid pressure in the second fluid connection and the first fluid connection is provided by the first valve arrangement configured to control the second valve arrangement for operating the pressure control system in at least two operating modes comprising:
a first mode, in which the second fluid chamber is connected to the first valve arrangement; and
a second mode, in which the first fluid chamber is connected to the second fluid chamber.

2. The tyre inflation pressure control system as claimed in claim 1, wherein the first valve arrangement configured to control the second valve arrangement for controlling the system is further configured for a third operating mode in which the first fluid chamber is connected to the first valve arrangement.

3. The tyre inflation pressure control system as claimed in claim 1, wherein the second valve arrangement comprises a first pressure control valve configured in a first operating position in which fluid pressure on an input activates a first main valve connecting the first fluid chamber to the first fluid connection.

4. The tyre inflation pressure control system as claimed in claim 3, wherein the second valve arrangement further comprises a second pressure control valve configured in a first operating position in which fluid pressure on an input activates a second main valve connecting the second fluid chamber to the first fluid connection.

5. The tyre inflation pressure control system as claimed in claim 4, wherein the input to the first pressure control valve is connected to the second fluid connection, the first pressure control valve configured in a second operating position in which fluid pressure on the input is passed to the input of the second pressure control valve, the second pressure control valve configured in a second operating position in which fluid pressure on the input activates both the first and the second main valves connecting the first and the second fluid chambers to each other.

6. The tyre inflation pressure control system as claimed in claim 5, wherein each of the first and the second pressure control valves has an output in the first position connected to a respective delay valve which, when charged, urges the respective pressure control valve to the respective second position.

7. The tyre inflation pressure control system of claim 1, wherein the second valve arrangement is mounted on one of the first and the second wheels.

8. A utility vehicle comprising:
   an axle assembly carrying the first vehicle wheel and the second vehicle wheel; and
   the tyre inflation pressure control system of claim 1.

9. The utility vehicle as claimed in claim 8, further comprising a pressurised fluid source and a chassis, wherein the first valve arrangement is connected to the pressurised fluid source and installed on the vehicle chassis.

\* \* \* \* \*